US009239995B2

(12) United States Patent
Oshiro et al.

(10) Patent No.: US 9,239,995 B2
(45) Date of Patent: Jan. 19, 2016

(54) SYSTEM AND METHOD FOR GENERATING VEHICLE DRIVE CYCLE PROFILES

(75) Inventors: Kevin S. Oshiro, Seattle, WA (US); John D. Duffy, Seattle, WA (US)

(73) Assignee: PACCAR INC, Bellevue, WA (US)

( * ) Notice: Subject to any disclaimer, the term of this patent is extended or adjusted under 35 U.S.C. 154(b) by 518 days.

(21) Appl. No.: 13/170,068

(22) Filed: Jun. 27, 2011

(65) Prior Publication Data
US 2012/0330479 A1 Dec. 27, 2012

(51) Int. Cl.
G06Q 50/30 (2012.01)
G06Q 10/04 (2012.01)

(52) U.S. Cl.
CPC .............. *G06Q 10/047* (2013.01); *G06Q 50/30* (2013.01)

(58) Field of Classification Search
USPC ............................................................ 701/1
See application file for complete search history.

(56) References Cited

U.S. PATENT DOCUMENTS

| | | | |
|---|---|---|---|
| 4,466,294 A | 8/1984 | Bennington | |
| 5,790,976 A * | 8/1998 | Boll et al. | 455/456.5 |
| 6,242,873 B1 | 6/2001 | Drozdz | |
| 7,272,491 B1 | 9/2007 | Berard | |
| 7,299,137 B2 | 11/2007 | Bartley | |
| 7,610,145 B2 | 10/2009 | Kantarjiev | |
| 7,797,102 B2 | 9/2010 | Fortier | |
| 2006/0129313 A1 * | 6/2006 | Becker et al. | 701/202 |
| 2006/0168592 A1 | 7/2006 | Andrews | |
| 2007/0150188 A1 * | 6/2007 | Rosenberg | 701/211 |
| 2008/0262712 A1 | 10/2008 | Duty | |
| 2011/0022298 A1 * | 1/2011 | Kronberg | 701/200 |
| 2011/0112747 A1 | 5/2011 | Downs | |
| 2012/0226391 A1 * | 9/2012 | Fryer et al. | 701/1 |

FOREIGN PATENT DOCUMENTS

| | | | | |
|---|---|---|---|---|
| JP | 2003111209 A | * | 4/2003 | B60L 11/14 |
| JP | 4051911 B2 | * | 2/2008 | |

OTHER PUBLICATIONS

International Search Report and Written Opinion mailed Dec. 20, 2012, issued in corresponding International Application No. PCT/US2012/044412, filed Jun. 27, 2012, 8 pages.

Arsie, I., et al., "ODECS—A Computer Code for the Optimal Design of S.I. Engine Control Strategies," SAE Technical Paper No. 960359, presented at the International Congress & Exposition, Detroit, Mich., Feb. 26-29, 1996, pp. 195-208.

Butler, K.L., et al., "A Matlab-Based Modeling and Simulation Package for Electric and Hybrid Electric Vehicle Design," IEEE Transactions on Vehicular Technology 48(6):1770-1778, Nov. 1999.

(Continued)

*Primary Examiner* — Shelley Chen
(74) *Attorney, Agent, or Firm* — Christensen O'Connor Johnson Kindness PLLC

(57) ABSTRACT

A system and method for generating vehicle drive cycles. Information describing a path of travel and a vehicle are received from a user. A detailed representation of the path of travel is obtained. Road condition information for segments of the path of travel is obtained, and the path of travel is verified as being traversable by the described vehicle. This information is used to generate a drive cycle profile, which contains at least the simulated path traversed by the vehicle, the speed of the vehicle along segments of the path, and any ambient conditions taken into account when predicting the speed of the vehicle.

22 Claims, 6 Drawing Sheets

(56) References Cited

OTHER PUBLICATIONS

Fröberg, A., "Efficient Simulation and Optimal Control for Vehicle Propulsion," Linköping Studies in Science and Technology: Dissertations, No. 1180, pp. 1-8 and 49-59, Apr. 2008.

Jacobsen, B., "On Vehicle Driving Cycle Simulation," SAE Technical Paper No. 950031, presented at the International Congress & Exposition, Detroit, Mich., Feb. 27-Mar. 2, 1995, 7 pages.

Lyons, T.J., et al., "The Development of a Driving Cycle for Fuel Consumption and Emissions Evaluation," Transportation Research Part A: General 20(6):447-462, Nov. 1986.

Mahapatra, S., et al., "Model-Based Design for Hybrid Electric Vehicle Systems," SAE Technical Paper No. 2008-01-0085, presented at the 2008 World Congress, Apr. 14-17, 2008, Detroit, Mich., 10 pages.

Markel, T., et al., "ADVISOR: A Systems Analysis Tool for Advanced Vehicle Modeling," Journal of Power Sources 110(2):255-266, Aug. 2002.

Montazeri-GH, M., et al., "Driving Cycle Simulation for Heady [sic] Duty Engine Emission Evaluation and Testing," SAE Technical Paper No. 2005-01-3796, presented at Powertrain & Fluid Systems Conference & Exhibition, Session: Emissions Measurement and Testing, Oct. 2005, San Antonio, Texas, pp. 1506-1524.

Roumégoux, J.-P., "The SIMULCO Software: Description of Modelling [sic] and Examples of Application," in C.A. Brebbia and P. Zannetti (eds.), "Development and Application of Computer Techniques in Environmental Studies VI," vol. 16, "Transactions: Ecology and the Environment," Dec. 1996, pp. 675-684.

Trajkovic, S., et al., "Vehicle Driving Cycle Simulation of a Pneumatic Hybrid Bus Based on Experimental Engine Measurements," SAE Technical Paper No. 2010-01-0825, presented at SAE 2010 World Congress & Exhibition, Advanced Hybrid Vehicle Powertrains, Apr. 2010, Detroit, Mich., 16 pages.

Wipke, K.B., et al., "Advisor 2.1: A User-Friendly Advanced Powertrain Simulation Using a Combined Backward/Forward Approach," Paper No. NREL/JA-540-26839, National Renewable Energy Laboratory, Golden, Colo., Aug. 1999, 12 pages.

Yi, T., et al., "Intelligent Energy Management Based on Driving Cycle Identification Using Fuzzy Neural Network," Proceedings of the Second International Symposium on Computational Intelligence and Design [ISCID '09], Changsha, China, Dec. 12-14, 2009, pp. 501-504.

Yu, L., "Remote Vehicle Exhaust Emission Sensing for Traffic Simulation and Optimization Models," Transportation Research Part D: Transport and Environment 3(5):337-347, Sep. 1998.

Extended European Search Report mailed Jan. 27, 2015, issued in corresponding EP No. 12804347.8, filed Jun. 27, 2012, 4 pages.

\* cited by examiner

SYSTEM AND METHOD FOR GENERATING VEHICLE DRIVE CYCLE PROFILES

BACKGROUND

A drive cycle profile is a collection of information describing the operation of a vehicle over a period of time or distance. For example, a drive cycle profile may include a vehicle's speed, time, and location over the course of a typical trip, over a particular time period, over a distance traveled, or over a lifetime of the vehicle. This information about typical vehicle use can then be consumed by vehicle simulation models, advanced driver assistance systems, and the like.

In some existing solutions, drive cycle profiles are collected by installing a data logging device in a vehicle to record the drive cycle profile information. This solution is limited in that new drive cycle profiles cannot be generated quickly, but instead must be collected in real time, and can only be collected for routes that were actually traveled while the data logging device was installed. In another existing solution, when drive cycle profiles are needed for simulation models, an existing database of drive cycle profiles previously created from data logging activities is consulted. However, this solution is also limited to drive cycle profiles previously collected from routes actually traveled.

What is needed is a system that is not constrained to using data that has been collected from actual vehicle operation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a computer-implemented method of generating a vehicle drive cycle profile is provided. A computer obtains vehicle configuration information and a path of travel. A computer obtains road condition information for segments of the path of travel. A computer generates a drive cycle profile based on the path of travel, the road condition information, and the vehicle configuration information.

In another embodiment, a system for generating drive cycle profiles is provided. The system comprises at least one processor and a tangible computer-readable medium. The computer-readable medium has computer-executable instructions stored thereon that, in response to execution by at least one processor of the system, cause the system to generate one or more drive cycle profiles by obtaining vehicle information and a path of travel, obtaining road information for segments of the path of travel, and generating a drive cycle profile based on the path of travel, the road condition information, and the vehicle configuration information.

In yet another embodiment, a tangible computer-readable medium is provided. The computer-readable medium has computer-executable instructions stored thereon that, if executed by a processor of a computing device, cause the computing device to perform actions for generating a drive cycle profile. The actions comprise obtaining vehicle configuration information and a path of travel, obtaining road condition information for segments of the path of travel, and generating more than one drive cycle profile based on the path of travel, the road condition information, and the vehicle configuration information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure is directed to several examples of systems and computer-implemented methods for automatically creating drive cycle profiles to replace drive cycle profiles obtained via data logging. Specifically, information that broadly describes a drive cycle is provided, and the systems generate a simulated drive cycle profile corresponding to the provided information.

In one aspect, one or more pieces of information are provided that broadly describe the drive cycle. This information can include a start location and an end location for the drive cycle, as well as intermediate waypoints and a preferred route to take during the drive cycle. The information can also include information describing a set of stops, including stop duration and location; engine idle periods; cargo load changes; speed limits, and the like. Information about the vehicle that would affect the drive cycle may also be provided, such as the vehicle model, weight, and configuration, among others.

Once the broad drive cycle information is obtained, the systems use the information along with information from external sources to generate a drive cycle profile. In one aspect, the systems use a computerized navigation system to plan a detailed route from the start location to the end location. The systems consult a database to obtain further information associated with the detailed route, such as road grade information, road curvature information, historical speed information, posted speed limits, traffic information, travel restrictions or regulations, and the like. Using the detailed route, the associated information about the route, and the provided vehicle information, the systems can simulate travel of the specified vehicle along the route to create the drive cycle profile.

Once created, the drive cycle profile can be used for multiple purposes. For example, the drive cycle profile can be stored for later use. As another example, the drive cycle profile can be converted into a portable format to be used by other simulation tools. As yet another example, information from the drive cycle profile can be further analyzed and presented in graphical form.

Figure 1:
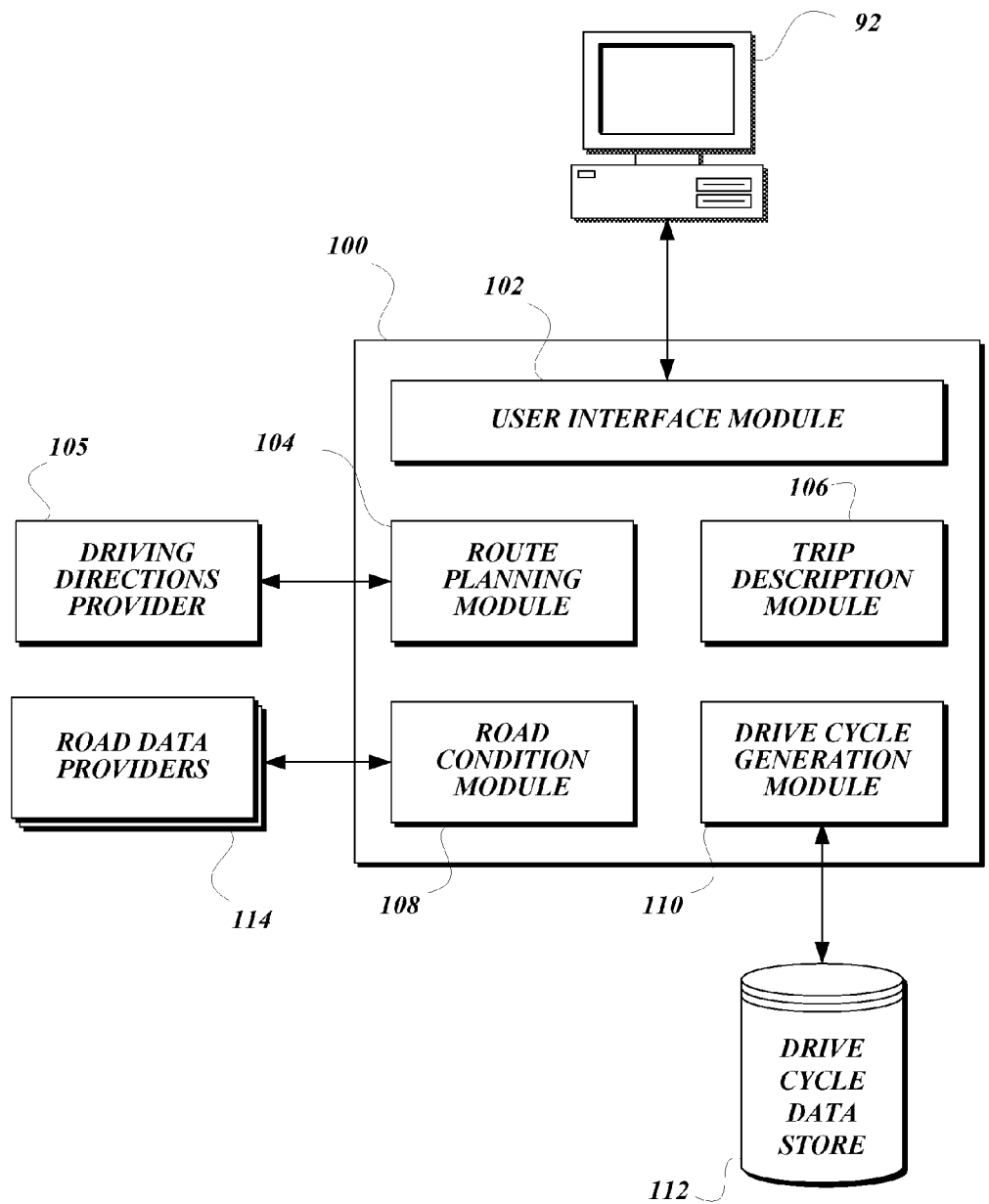
FIG. 1 illustrates one embodiment of a drive cycle generation system, according to various aspects of the present disclosure.
Figure 2A:
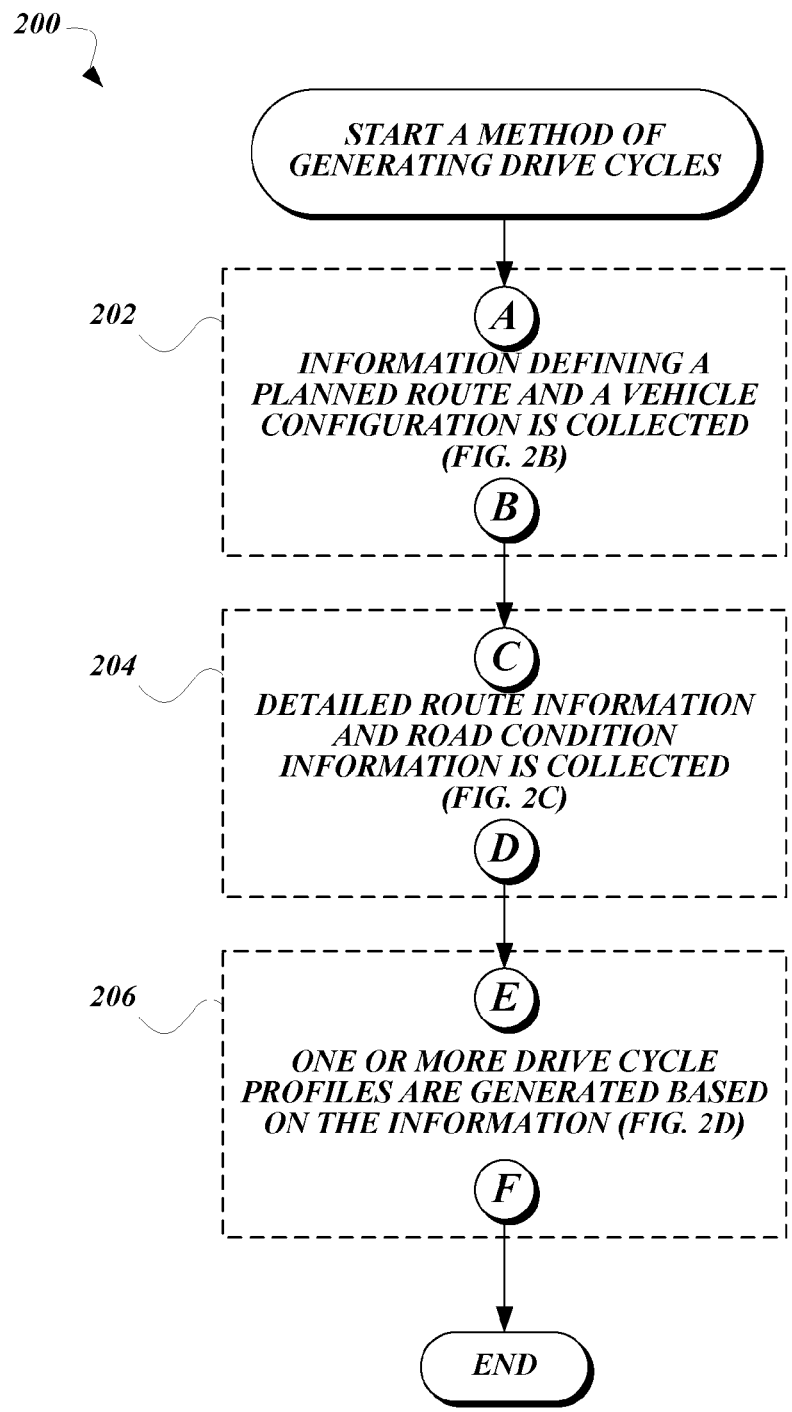
FIGS. 2A-2D illustrate one embodiment of a method 200 of generating drive cycle profiles according to various aspects of the present disclosure.
Figure 2B:
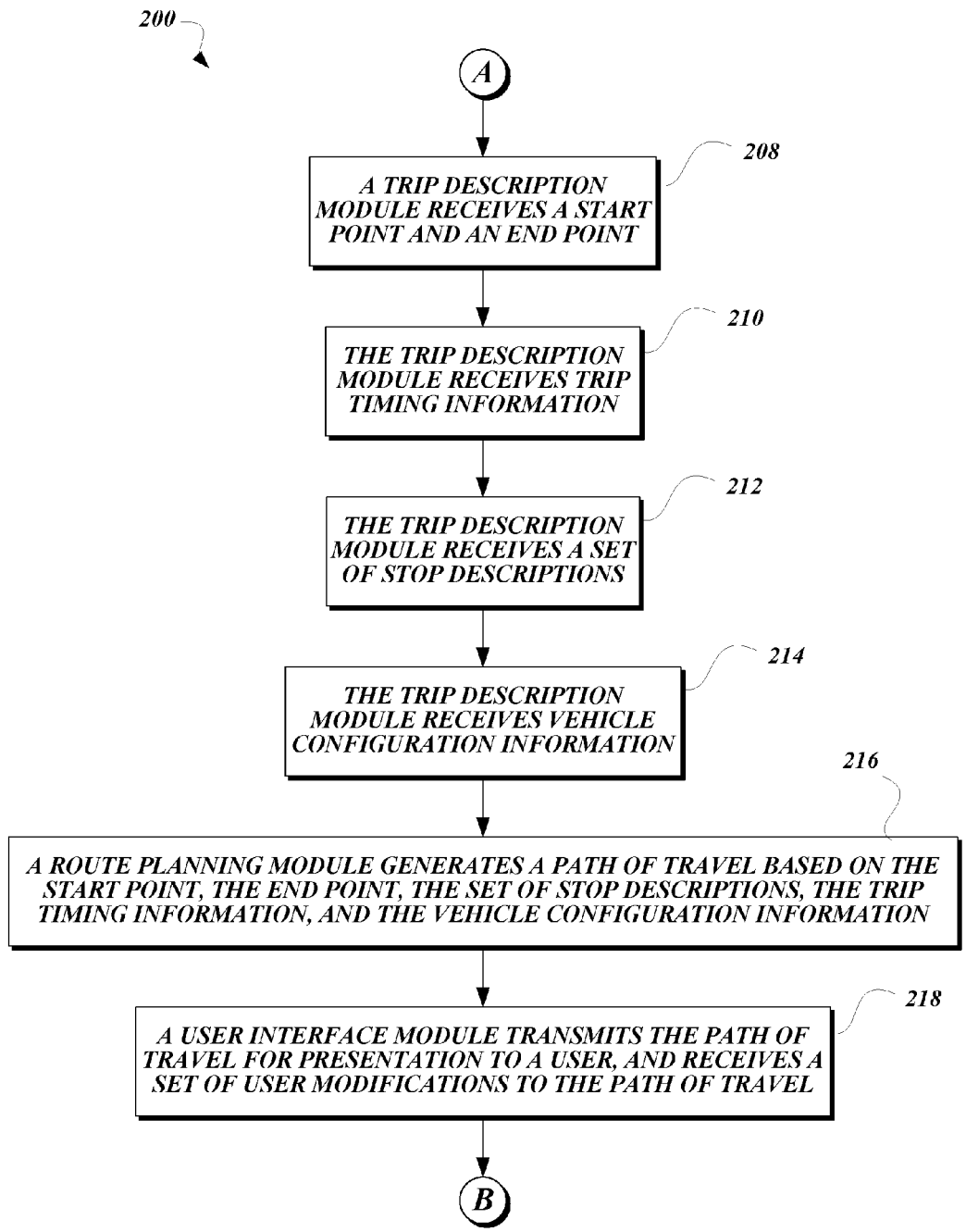
Figure 2C:
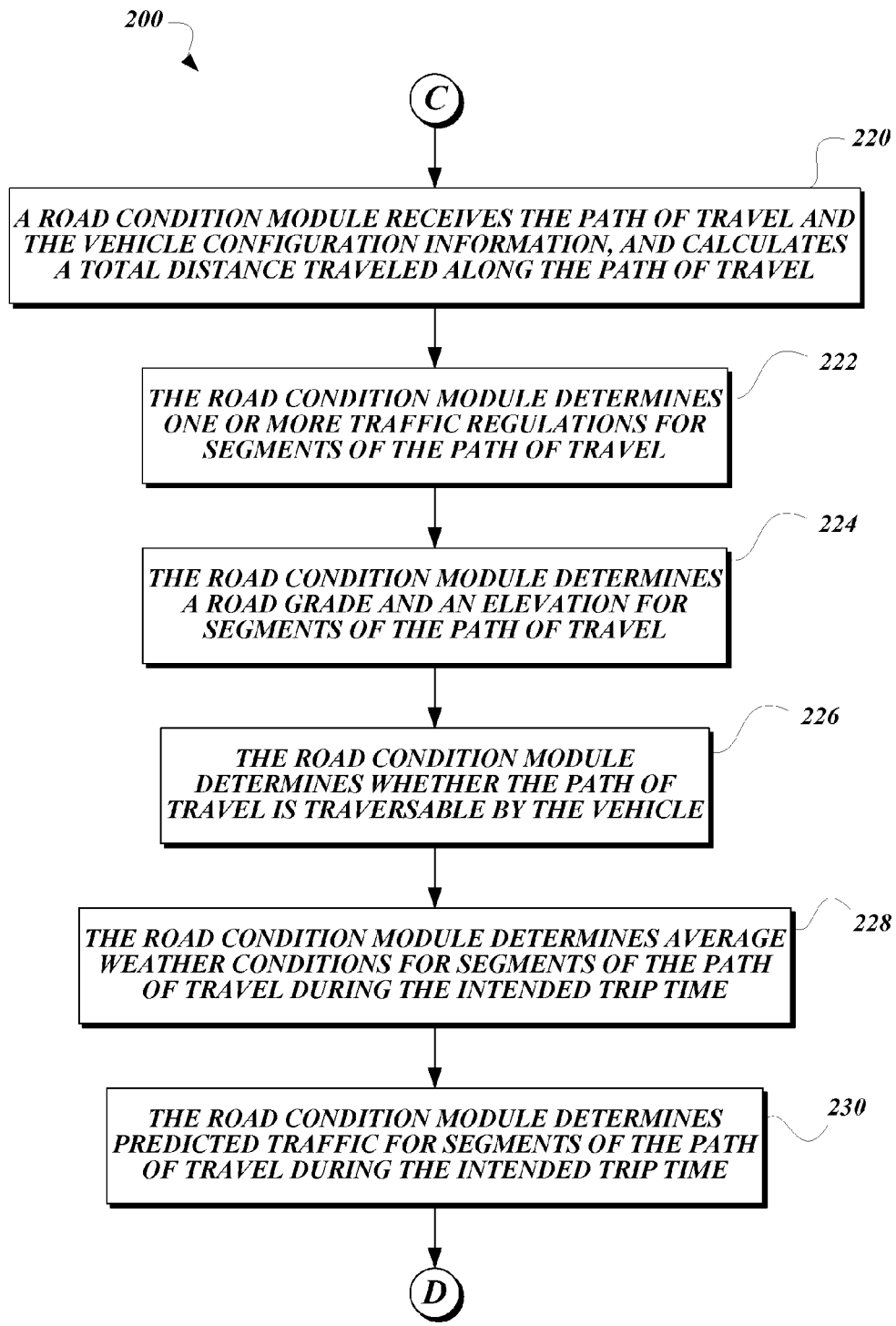
Figure 2D:
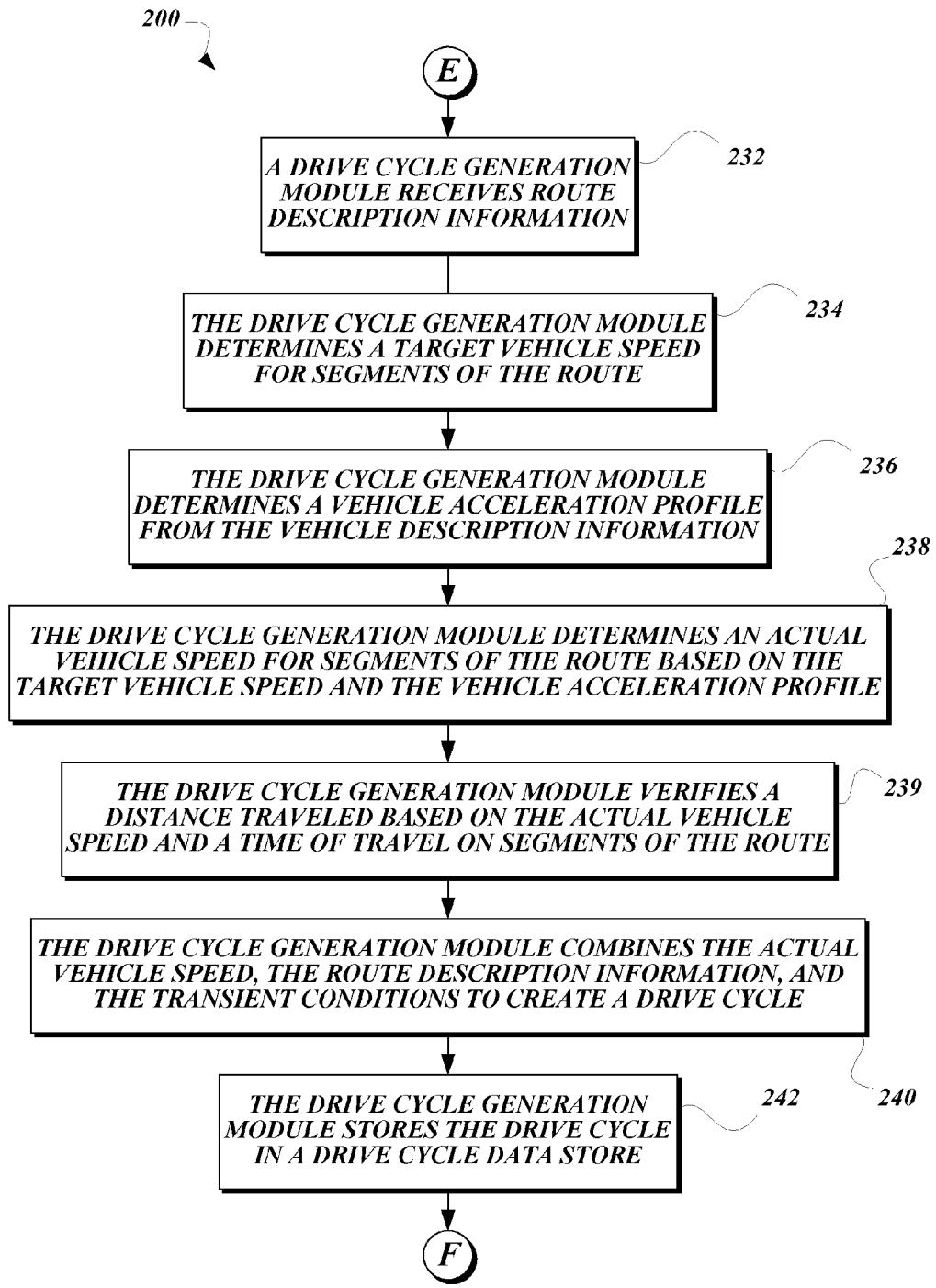

FIG. 1 illustrates one embodiment of a drive cycle profile generation system 100 according to various aspects of the present disclosure. In one embodiment, the drive cycle profile generation system 100 is a server computer that includes at least a processor, a memory, a network controller, and a computer-readable storage medium, wherein the server computer is specially programmed to perform the actions described below. The computer-readable storage medium may be any suitable tangible storage medium, such as a hard disk drive, a floppy disk, a flash drive, an optical disk, and the like. In one embodiment, the drive cycle profile generation system 100 is a server computer. In other embodiments, the drive cycle profile generation system 100 may be any computing device configured to perform the actions described below, such as a personal computer, a smart phone, a cloud computing service, a tablet computer, an embedded device, and the like.

A client computing device 92 connects with a user interface module 102 of the drive cycle profile generation system 100. In one embodiment, the client computing device 92 is an appropriately configured personal computer that includes at least a processor, a memory, a network controller, and a computer-readable storage medium. The client computing device 92 is configured with a client application, such as a set of executable instructions, which connects to the user interface module 102 to present a user interface to a user. In other embodiments, the client computing device 92 is another suitable type of computing device, such as a smart phone, a tablet computer, a laptop computer, a notebook computer, and the like.

In one embodiment, the client computing device 92 connects to the drive cycle profile generation system 100 over a wide area network, such as the internet. In other embodiments, the client computing device 92 may connect to the drive cycle profile generation system 100 by a wired or wireless connection via some other suitable type of network, such as a local area network, a WiFi® network, a WiMAX® network, a Bluetooth® network, a cellular network, a ZigBee® network, and the like. In yet another embodiment, the client computing device 92 may be the same computing device as the drive cycle profile generation system 100, and may communicate with the drive cycle profile generation system 100 via standard interprocess communication methods without having to transmit request data over a network.

In the embodiment shown in FIG. 1, the drive cycle profile generation system 100 also includes one or more of a route planning module 104, a trip description module 106, a road condition module 108, and a drive cycle generation module 110. In one embodiment, each module of the drive cycle profile generation system 100 is a computing device specially programmed with computer-executable instructions that, if executed by a processor of the drive cycle profile generation system 100, cause the drive cycle profile generation system 100 to perform the actions described herein. In another embodiment, each module comprises computer-executable instructions stored on a tangible computer-readable medium that, if executed by a processor of the drive cycle profile generation system 100, cause the drive cycle profile generation system 100 to perform the actions described herein. The embodiments of the actions described herein are split between the modules for ease of discussion. In another embodiment, actions described as performed by separate modules may instead be performed by a single module, or actions described as performed by a single module may be performed by multiple modules.

The trip description module 106 collects trip description information from a client computing device 92 via the user interface module 102. The trip description information includes at least a start location and an end location. The trip description information may also include one or more stop locations, a description of the vehicle, trip start and end times, and the like. Further details regarding the trip description information are provided below.

The route planning module 104 uses the trip description information collected by the trip description module 106 to determine a planned route for the trip. In one embodiment, the route planning module 104 uses road information stored in a database to determine a shortest, fastest, or most fuel efficient path between the start location and the end location. If the trip description information includes one or more stop locations, the route planning module 104 determines a path that includes each of the stop locations, either in an optimum order or in an order specified by the trip description information. In one embodiment, the route planning module 104 does not itself store the road information, but instead federates a query based on the trip description information to an external driving directions provider. Further details regarding the planned route are provided below.

The road condition module 108 receives the planned route for the trip, and determines a condition of the road at points along the planned route. The condition of the road may include road grade, road elevation, road curvature, speed limits, vehicle restrictions or regulations, historical traffic data, loading interchanges, traffic lights, and the like. The road condition module 108 may contain a database of road condition information, and may also obtain other road condition information from one or more third-party road data providers 114. Further details concerning obtaining road condition information are provided below.

The drive cycle generation module 110 uses the trip description information, the planned route, and/or the road condition information to generate one or more drive cycle profiles. In one embodiment, the drive cycle generation module 110 generates the drive cycle profiles by using vehicle description information included in the trip description information to simulate travel of the described vehicle along the planned route, given the road condition information.

In one embodiment, portions of the trip description information, the planned route, and the road condition information may be randomized by the drive cycle generation module 110 to produce multiple drive cycle profiles from a single set of inputs. In one embodiment, expected weather or traffic information provided as part of the road condition information may be randomly altered to automatically generate drive cycle profiles for a variety of different conditions. For example, if historical traffic data indicates that the average speed on a portion of the route at a given time is 40 miles per hour, the drive cycle generation module 110 may randomly vary the expected speed for that portion of the route, such as to 20 miles per hour (to indicate heavier than normal traffic) and 60 miles per hour (to indicate lighter than normal traffic). In another embodiment, the drive cycle generation module 110 may alter a specified gross combined weight of the vehicle to indicate different amounts of cargo between specified or predetermined limits.

The generated drive cycle profile includes information that allows a consumer of the drive cycle profile to simulate the performance of a vehicle experiencing the drive cycle. This may include information representing a speed of the vehicle at points along the planned route. Any suitable storage format may be used. In one embodiment, the speed information may be stored as a function of time and distance. For example, the generated drive cycle profile may state that the vehicle travels along the planned route for 20 minutes at 60 miles per hour, and then for 5 minutes at 10 miles per hour, and so on. In another embodiment, speed information may be stored for segments of the planned route. For example, the generated drive cycle profile may state that the vehicle travels along a first segment of the planned route at 60 miles per hour, and then along a second segment of the planned route at 10 miles per hour, and so on.

In several embodiments, the generated drive cycle profile also includes information regarding the road conditions and ambient conditions considered during drive cycle profile generation. For example, if the drive cycle generation module 110 determined that traffic on a portion of the planned route would be heavy, an indication thereof is included in the generated drive cycle profile. As another example, if the vehicle cargo load changes over the course of the drive cycle, the changes in vehicle cargo load are included in the generated drive cycle profile. Further discussion of the information that may be included in the generated drive cycle profile is provided below.

Once completed, the drive cycle generation module 110 stores the generated drive cycle profile in a drive cycle data store 112. The drive cycle data store 112 may be any suitable data storage location. In one embodiment, the drive cycle data store 112 may be a file stored on a computer-readable storage medium attached directly to the drive cycle generation system 100. In another embodiment, the drive cycle data store 112 may be a database stored on the attached computer-readable storage medium. In yet another embodiment, the drive cycle data store 112 may be a database stored on a database server accessible by the drive cycle generation system 100 over a network.

In one embodiment, the drive cycle data store 112 may be accessible by other systems that consume the generated drive cycle profiles. For instance, an advanced driver assistance system located within a vehicle may prompt a vehicle operator to more closely follow an expected performance profile represented by a generated drive cycle profile. As another example, generated drive cycle profiles may be used to guide the driving of a vehicle operator during a fuel economy test drive. As yet another example, generated drive cycle profiles may be used in vehicle simulation models, such as when configuring a vehicle for optimum performance over an expected route represented by the generated drive cycle profiles. Embodiments of the present disclosure provide advantages in these roles, as the generated drive cycle profiles do not require profile data recorded from an actual vehicle while traveling along the planned route. Hence, generated drive cycle profiles may be stored in the drive cycle data store 112 for any route, including routes that have not been traveled in the past.

FIGS. 2A-2D illustrate one embodiment of a method 200 of generating drive cycle profiles according to various aspects of the present disclosure. From a start block (FIG. 2A), the method 200 proceeds to a set of method steps 202 defined between a continuation terminal ("terminal A") and an exit terminal ("terminal B"). The set of method steps 202 describe steps in which information defining a planned route and a vehicle configuration is collected.

From terminal A (FIG. 2B), the method 202 proceeds to block 208, where a trip description module 106 receives a start point and an end point. In one embodiment, the start point and the end point are specified by a street address. In other embodiments, these points may be specified in other suitable formats, such as by specifying an intersection, a landmark, a latitude/longitude location, a click on a displayed map, and the like. In yet another embodiment, a start point and end point are not used, but instead each segment of the planned route is provided to the trip description module 106.

Next, at block 210, the trip description module 106 receives trip timing information. In one embodiment, the trip timing information includes at least a start time, an end time, a start date, or an end date, and may include any combination of these four values. The start time and start date indicate when the described trip would begin, and the end time and end date indicate when the described trip would end. If one or more of these parameters is missing, the drive cycle profile generation system 100 may derive the missing parameter from the rest of the trip description, route planning, and road condition information. In one embodiment, if the described trip cannot be completed in the specified time period, the user interface module 102 transmits an error message to the client computing device 92. In one embodiment, the trip timing information is more general, and includes a specification of the time of year, such as winter, summer, and the like.

After block 210, the method 200 proceeds to block 212. At block 212, the trip description module 106 receives a set of stop descriptions. The set of stop descriptions may include zero, one, or more than one stop description. Each stop description includes a location of the stop, and is specified in a format similar to the start point and end point. In one embodiment, a stop description may include further information about activities taking place during the stop. For example, the stop description may specify a duration of the stop, an amount of cargo added or removed from the vehicle during the stop, whether the vehicle engine is allowed to idle or is turned off, whether vehicle accessories such as a power take off unit are used during the stop, whether the vehicle takes on fuel during the stop, and the like.

At block 214, the trip description module 106 receives vehicle configuration information. In one embodiment, the vehicle configuration information includes information relevant to the performance of the vehicle. This information may include, but is not limited to: a gross combined weight of the vehicle, an initial load of cargo, a drive train configuration, dimensions of the vehicle, an engine performance profile, a fuel economy profile, a fuel capacity and initial load of fuel, a model of the vehicle, a role for the vehicle, an accessory associated with the vehicle, hybrid vehicle information such as standard or conventional powertrain configuration information, parallel hybrid or serial hybrid configuration information, and the like. The role for the vehicle may describe in general a type of service being provided by the vehicle, such as local delivery, long haul cargo transfer, job site support, and the like.

Next, at block 216, a route planning module 104 generates a path of travel based on at least the start point, the end point, and the set of stop descriptions. In one embodiment, the path of travel comprises a set of road network segments to be traversed to travel from the start point to the end point. The route planning module 104 may also base the path of travel on the trip timing information and the vehicle configuration information. In one embodiment, the route planning module 104 accesses a local map database, and uses road network information stored therein to determine a shortest or quickest route from the start point to the end point that passes through each of the locations specified in the stop descriptions. In another embodiment, the route planning module 104 constructs a request for a path of travel beginning at the start point and passing through each of the stop locations before arriving at the end point, and uses the request to obtain the path of travel from a third-party driving directions provider 105.

In one embodiment, the route planning module 104 may construct the request to form the shortest path between each of the described stop locations, or may construct the request to form a path between the described stop locations in a specified order. In one embodiment, the route planning module 104 may take the vehicle configuration information into account when determining the path. For example, the route planning module 104 may determine that the gross combined weight of the vehicle exceeds a weight limit for a particular road or bridge, and may exclude that road or bridge from the route even if it is otherwise the shortest or quickest path. As another example, the route planning module 104 may determine that a dimension of the vehicle, such as the height, exceeds a maximum height for passing under a bridge, tunnel, or viaduct, and may exclude that path from the route. As still another example, the route planning module 104 may determine that a road segment includes a hazardous material restriction incompatible with a planned cargo of the vehicle, and may exclude that segment from the planned route. In yet another embodiment, wherein the trip description module 106 received data indicating each segment of the planned route, the route planning module 104 may merely ensure that the described vehicle can traverse the planned route without doing any route planning.

At block 218, a user interface module 102 transmits the path of travel to the client computing device 92 for presentation to a user. In one embodiment, the path of travel is presented to the user within an interface that allows the user to provide feedback on the determined path of travel. For example, the user may use the interface to change the path of travel according to user insight into a preferable alternate route (preferring a longer, faster path instead of a shorter, slower path or a more fuel efficient path), according to changing user preferences (reordering stops, adding or removing stops, changing the start point or end point), and the like. The user interface module 102 then receives a set of user modifications to the path of travel. The user modifications are received by the route planning module 104 and are applied to the path of travel to create a modified path of travel.

The method 200 proceeds to terminal B, and then to another set of method steps 204 (FIG. 2A) defined between a continuation terminal ("terminal C") and an exit terminal ("terminal D"). The set of method steps 204 describe steps in which detailed route information and road condition information is collected.

From terminal C (FIG. 2C), the method 200 proceeds to block 220, where a road condition module 108 receives the path of travel, such as the modified path of travel, and the vehicle configuration information, and calculates a total distance traveled along the path of travel. At block 222, the road condition module 108 determines one or more traffic regulations for segments of the path of travel. For example, the road condition module 108 may determine a speed limit for road network segments in the modified path of travel, maximum allowed vehicle weights for the road network segments, and the like. At block 224, the road condition module 108 may also determine a road grade and an elevation for segments of the path of travel. The road condition module 108 may also determine a surface of the road for segments of path of travel, such as paved, gravel, dirt, and the like. In one embodiment, the road condition module 108 may retrieve the traffic regulations and the road grade/elevation/surface information from one or more third-party road data providers 114, such as NAVTEQ®, Tele Atlas, and/or the like. In another embodiment, the road condition module 108 may have access to a local database of traffic regulations and road grade/elevation information, and may query the local database for this information.

At block 226, the road condition module 108 may further determine whether the path of travel is traversable by the vehicle. In one embodiment, the road condition module 108 may compare the model and drive train of the vehicle to the road grade information to determine if there are any portions of the modified path of travel that are too steep for the vehicle to safely and/or economically traverse. In one embodiment, the road condition module 108 may compare the vehicle description to the traffic regulations to determine whether any regulations would prevent the vehicle from traversing any portion of the modified path of travel. If any problems are detected, the method 200 may be interrupted, and the user interface module 102 may cause a warning message to be presented to the user by the client computing device 92.

At block 228, the road condition module 108 may further determine average weather conditions for segments of the path of travel during the intended trip time. For example, the road condition module 108 may determine that, when traversing a portion of the path of travel during winter, there is a 30% chance that the road will be covered with snow and would therefore require slower-than-normal travel and/or the use of tire chains. If a start date/time or end date/time was not specified, this step may be omitted, or a default time period may be used. In one embodiment, the average weather conditions are obtained from a third-party road data provider 114, or a special provider of weather information.

At block 230, the road condition module 108 may further determine predicted traffic for segments of the path of travel during the intended trip time. For example, the road condition module 108 may predict a time when the vehicle would be at a certain point in the route based on speed limit information retrieved in block 222, and may retrieve traffic information for that point in the route at that time of day from a third-party road data provider 114. If a start date/time or end date/time was not specified, this step may be omitted, or a default time period may be used.

Next, the method 200 proceeds to terminal D, and then to another set of method steps 206 (FIG. 2A) defined between a continuation terminal ("terminal E") and an exit terminal ("terminal F"). The set of method steps 206 describe steps in which one or more drive cycle profiles are generated based on the information.

From terminal E (FIG. 2D), the method 200 proceeds to block 232, where a drive cycle generation module 110 receives route description information. The route description information may include the information collected by the trip description module 106, the path of travel, the information collected by the road condition module 108, and/or the like. At block 234, the drive cycle generation module 110 determines a target vehicle speed for segments of the route. The drive cycle generation module 110 may base the target vehicle speed on one or more of the speed limit, the predicted weather conditions, the grade information, the surface information, the predicted traffic information, etc.

Next, at block 236, the drive cycle generation module 110 determines a vehicle acceleration profile from the vehicle description information. In one embodiment, the vehicle acceleration profile indicates at least how quickly the vehicle can accelerate with a given load on a given grade. In one embodiment, the vehicle acceleration profile is determined from the gross combined weight, the drive train, and/or the engine performance profile, etc.

At block 238, the drive cycle generation module 110 determines an actual vehicle speed for segments of the route based on the target vehicle speed and the vehicle acceleration profile. For example, if a given segment was determined to have a target vehicle speed of 30 miles per hour, and a next segment was determined to have a target vehicle speed of 70 miles per hour (such as when merging from a surface street onto a highway), the drive cycle generation module 110 uses the vehicle acceleration profile to determine the speed of the vehicle at the relevant segments of the route while accelerating from 30 miles per hour to 70 miles per hour. The drive cycle generation module 110 may also consider the road condition information, and may alter the determined speed accordingly. For example, if the vehicle is transitioning from 30 miles per hour to 70 miles per hour while traversing an uphill grade, the vehicle may take longer to reach the target speed.

Next, at block 239, the drive cycle generation module 110 verifies a distance traveled for segments of the route by performing a calculation based on the determined actual vehicle speed and a time of travel for the segments of the route. The calculation may be an integration calculation, and may be used to ensure that the values determined for distance traveled along each segment of the route are valid.

The method 200 then proceeds to block 240, where the drive cycle generation module 110 combines the actual vehicle speed, the route description information, and optionally the ambient conditions to create a drive cycle profile. Though simulated, the drive cycle profile contains information similar to that collected by sensors while profiling an actual drive cycle according to a traditional method. For example, the drive cycle profile contains descriptions of the vehicle performance, including the vehicle configuration, speed, acceleration, gross combined weight, and the like. The drive cycle profile may also contain descriptions of the path traveled, including the road condition information, the path of travel, the grade, the altitude, the stop descriptions, and the like.

The ambient conditions included in the drive cycle profile, such as the weather conditions, the traffic conditions, and the like, are not easily captured in traditional methods, and provide at least one benefit to using the current system instead of traditional methods.

In one embodiment, the drive cycle generation module 110 may create more than one drive cycle profile based on the collected and generated information. By using statistical techniques such as Monte Carlo methods and the like, the drive cycle generation module 110 may randomly update the input or the output of the drive cycle generation to create multiple drive cycle profiles. For example, the drive cycle generation module 110 may alter the actual vehicle speed generated by the system to randomly vary the generated actual vehicle speed to mimic the actions of a real driver or the uncertainty of real world conditions. As another example, the drive cycle generation module 110 may randomly alter the weather or traffic information for portions of the route to generate drive cycle profiles under different traffic or weather conditions without requiring additional user input.

At block 242, the drive cycle generation module 110 stores the one or more drive cycle profiles in a drive cycle data store 112. The drive cycle data store 112 may then be accessed by vehicle simulation tools, advanced driver assistance systems, a GPS display, a data analysis tool, or any other system that consumes drive cycle profile information. The drive cycle profiles may be stored in a proprietary format, or may be stored in a standard format to provide broader usability. From block 242, the method 200 proceeds to terminal F, and terminates.

The various blocks describing method 200 may be performed sequentially, in parallel, or in a different order than those described herein. As a nonlimiting example, blocks 222, 224, 226, 228, and 230 may be performed in any order, or may be performed in parallel. As another nonlimiting example, blocks 208, 210, 212, and 214 may be performed in parallel or in any order. It should also be appreciated that in some implementations one or more of the illustrated blocks may be eliminated, combined or separated into additional blocks. The described and illustrated method 200 may also include various additional blocks not shown.

Figure 3:
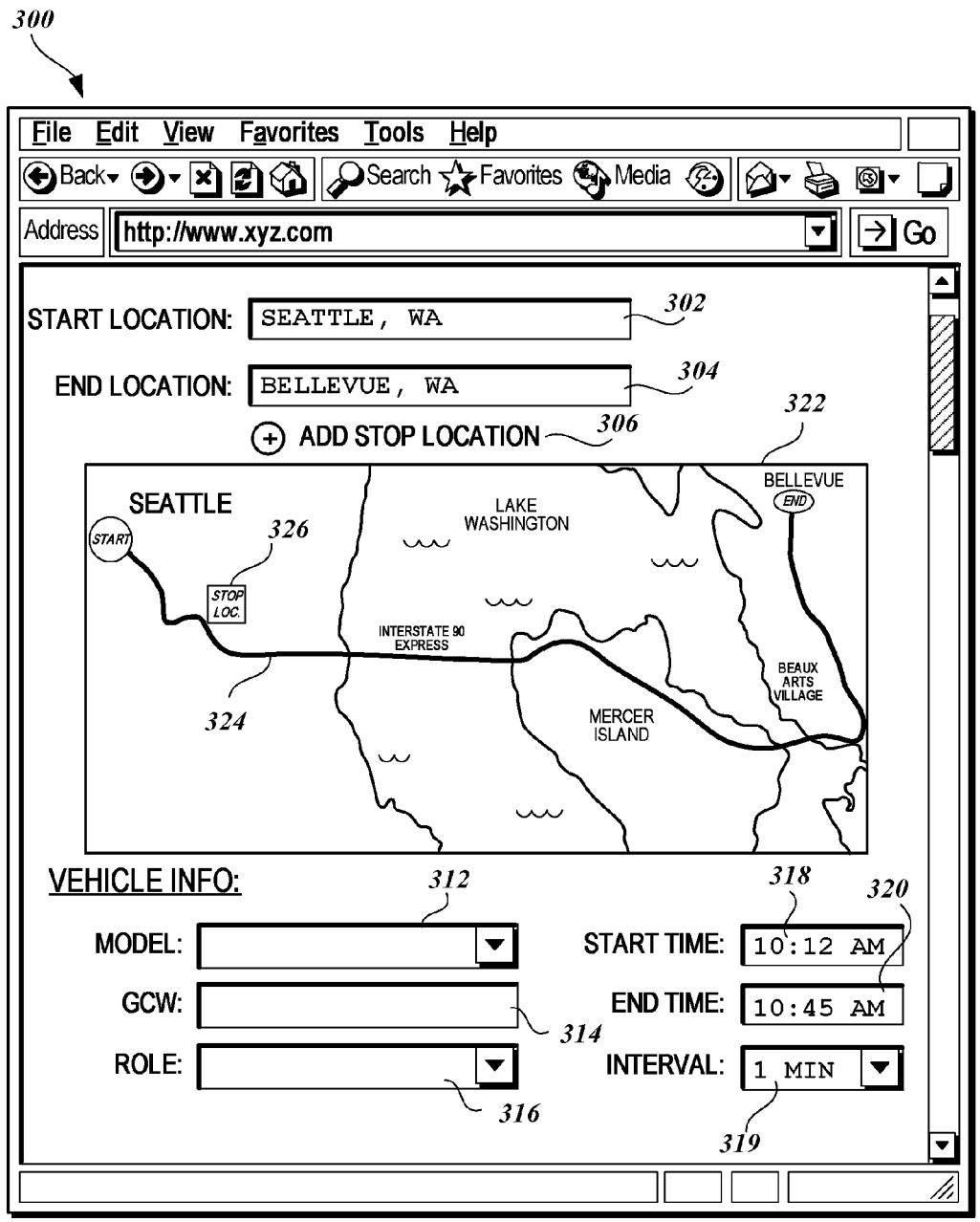
FIG. 3 illustrates one embodiment of an interface 300 presented by the user interface module 102 to the client computing device 92 to specify information for generating drive cycle profiles, according to various aspects of the present disclosure.

FIG. 3 illustrates one embodiment of an interface 300 presented by the user interface module 102 to the client computing device 92 to specify information for generating drive cycle profiles, according to various aspects of the present disclosure. The interface 300 is illustrated as a web application presented by a traditional web browser. However, in other embodiments, the interface 300 may be a stand-alone desktop application, an application executing on a mobile device, or any other suitable interface. The interface 300 includes a field to enter a start location 302 and a field to enter an end location 304. As outlined above, the locations may be specified by address, by landmark, by latitude/longitude, by intersection, by clicking on a map 322, or by any other suitable method.

An interface control for allowing a user to add a stop location 306 is also provided. When a user actuates the control 306, an additional interface is presented (not shown) that allows the user to provide information describing the stop. As discussed above, the stop description information may include a location of the stop, a duration of the stop, one or more activities performed during the stop, whether fuel is taken on during the stop, a cargo change during the stop, whether the engine is idle or off during the stop, and the like.

Once the route is calculated, the planned route of travel 324 is displayed on the map 322, along with any stop location 326. In one embodiment, the user may click on or drag the planned route of travel 324 to edit the route or add stop locations, and may click on an existing stop location 326 to edit the stop location.

In one embodiment, the interface 300 also allows the user to specify a start time 318 and end time 320, or a start date and end date (not illustrated), as discussed above. In one embodiment, the interface 300 also allows the user to specify a time interval 319. The time interval may represent the granularity at which the drive cycle profile is generated. That is, if the user selects an interval of one minute, the drive cycle generation module 110 may generate target vehicle speeds and/or the like at one minute intervals while traveling along the path of travel, and/or the generated drive cycle profile may contain information describing the status of the vehicle at one-minute intervals during the drive cycle. In the illustrated embodiment, the interface 300 may allow the user to choose from a predetermined list of possible increments, but in other embodiments, the interface 300 may allow the user to specify any desired increment.

The illustrated interface 300 also provides interface controls for allowing the user to specify a vehicle model 312, a vehicle gross combined weight 314, and a vehicle role 316. As illustrated, the vehicle model 312 and vehicle role 316 may either be typed in by the user, or may be selected from a list of available options by selecting the pull-down menu.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A computer-implemented method of generating a vehicle drive cycle profile, the method comprising:
   obtaining, by a computer, vehicle configuration information and a path of travel;
   obtaining, by the computer, road condition information for segments of the path of travel;

receiving, by the computer, an indication of a level of granularity, wherein the level of granularity is representative of regular time intervals during a drive cycle along the path of travel; and generating, by the computer, a drive cycle profile containing vehicle status information at the regular time intervals along the path of travel according to the level of granularity, wherein the generated drive cycle profile is based on the path of travel, the road condition information, the vehicle configuration information, and a change in vehicle configuration along the path of travel.

2. The computer-implemented method of claim 1, wherein obtaining a path of travel includes:

receiving a start location and an end location; and receiving the path of travel in response to a request transmitted to a driving directions provider, the request based on at least the start point and the end point.

3. The computer-implemented method of claim 2, wherein the request is based on at least one stop location.

4. The computer-implemented method of claim 1, wherein obtaining road condition information for segments of the path of travel includes obtaining speed limit information for segments of the path of travel.

5. The computer-implemented method of claim 1, wherein obtaining road condition information for segments of the path of travel includes obtaining one or more of grade information, road elevation information, and road curvature information.

6. The computer-implemented method of claim 1, wherein generating a drive cycle profile includes:

determining target vehicle speeds for segments of the path of travel; and determining an actual vehicle speed for the segments of the path of travel by calculating a simulated performance of the vehicle for the segments of the path of travel based on the target vehicle speeds and a vehicle acceleration profile.

7. The computer-implemented method of claim 6, wherein determining the target vehicle speed for a given segment of the path of travel is based on one or more of a speed limit, a grade of the segment, a predicted weather condition, a predicted traffic condition of the segment, and a surface of the segment.

8. The computer-implemented method of claim 6, further comprising verifying a distance traveled for segments of the path of travel based on the determined actual vehicle speed and a time of travel for the segments of the path of travel.

9. A system for generating drive cycle profiles, the system comprising:

at least one processor; and a tangible computer-readable medium having that, in response to execution by at least one processor of the system, cause the system to generate one or more drive cycle profiles by:

obtaining vehicle configuration information and a path of travel;

obtaining road condition information for segments of the path of travel;

receiving an indication of a level of granularity, wherein the level of granularity is representative of regular time intervals during a drive cycle along the path of travel; and generating a drive cycle profile containing vehicle status information at the regular time intervals along the path of travel according to the level of granularity, wherein the generated drive cycle profile is based on the path of travel, the road condition information, the vehicle configuration information, and a change in vehicle configuration along the path of travel.

10. The system of claim 9, wherein obtaining a path of travel includes receiving a stop description for a stop along the path of travel.

11. The system of claim 10, wherein the stop description includes a stop location and a stop duration.

12. The system of claim 10, wherein the stop description includes an indication of whether a vehicle engine is running or is not running during the stop.

13. The system of claim 12, wherein generating a drive cycle profile includes generating information indicating times during the drive cycle when the engine is running and times during the drive cycle when the engine is not running.

14. The system of claim 10, wherein the stop description includes an indication of an activity that is performed using the vehicle during the stop.

15. The system of claim 14, wherein the activity is removing cargo from the vehicle.

16. A tangible computer-readable medium having computer-executable instructions stored thereon that, if executed by a processor of a computing device, cause the computing device to perform actions for generating a drive cycle profile, the actions comprising:

obtaining vehicle configuration information and a path of travel;

obtaining road condition information for segments of the path of travel;

receiving an indication of a level of granularity, wherein the level of granularity is representative of regular time intervals during a drive cycle along the path of travel;

randomizing the road condition information of the path of travel to produce a plurality of different road conditions; and generating a plurality of different drive cycle profiles, wherein each of the plurality of drive cycles contains vehicle status information at the regular time intervals along the path of travel according to the level of granularity, and wherein the plurality of different drive cycle profiles are based on the path of travel, the plurality of different road conditions, the vehicle configuration information, and a change in vehicle configuration along the path of travel.

17. The computer-readable medium of claim 16, wherein generating the plurality of different drive cycle profile includes:

generating an actual vehicle speed for segments of the path of travel by using the vehicle configuration information to simulate performance of the vehicle over the segments of the path of travel; and randomly altering the actual vehicle speed within a range of values for segments of the path of travel, wherein the plurality of different drive cycle profiles are based on the randomly altered actual vehicle speed.

18. The computer-readable medium of claim 16, the actions further comprising storing the plurality of different drive cycle profiles in a drive cycle data store.

19. The computer-readable medium of claim 16, the actions further comprising validating the path of travel based on the vehicle configuration information and the road condition information.

20. The system of claim 14, wherein the activity is activating a power take off unit of the vehicle.

21. The computer-implemented method of claim 1, wherein the change in vehicle configuration along the path of travel comprises a change in vehicle cargo load.

22. The computer-implemented method of claim 1, wherein the level of granularity comprises a time interval.

* * * * *